United States Patent [19]

Cousin

[11] Patent Number: 5,646,912
[45] Date of Patent: Jul. 8, 1997

[54] MEDICATION COMPLIANCE, CO-ORDINATION AND DISPENSING SYSTEM

[76] Inventor: Damon S. Cousin, 2401 Houma Blvd., Metairie, La. 70001

[21] Appl. No.: 591,711

[22] Filed: Jan. 25, 1996

[51] Int. Cl.$^6$ .............................. G04B 47/00; B65D 83/04
[52] U.S. Cl. .................................. 368/10; 221/2; 221/3; 221/15; 221/96
[58] Field of Search .................................. 368/10, 28, 29, 368/276; 221/2, 3, 15, 96, 123; 340/309.15, 309.4; 364/479, 569

[56] References Cited

U.S. PATENT DOCUMENTS

| | | |
|---|---|---|
| 4,147,021 | 4/1979 | Kondo . |
| 4,462,696 | 7/1984 | Yung et al. . |
| 4,695,954 | 9/1987 | Rose et al. .............................. 364/413 |
| 4,748,600 | 5/1988 | Urquhart .................................... 368/10 |
| 4,768,177 | 8/1988 | Kehr et al. ................................. 368/10 |
| 4,785,981 | 11/1988 | Rodman . |
| 4,911,327 | 3/1990 | Shepherd et al. ............................ 221/3 |
| 5,159,581 | 10/1992 | Agans . |
| 5,291,191 | 3/1994 | Moore . |
| 5,329,459 | 7/1994 | Kaufman et al. . |
| 5,367,505 | 11/1994 | Tsuchiya et al. . |
| 5,392,952 | 2/1995 | Bowden . |
| 5,400,301 | 3/1995 | Rackley . |
| 5,408,443 | 4/1995 | Weinberger ................................. 368/10 |
| 5,431,299 | 7/1995 | Brewer et al. ................................. 221/2 |

Primary Examiner—Vit W. Miska
Attorney, Agent, or Firm—C. Emmett Pugh; Pugh/Associates

[57] ABSTRACT

A medication compliance, co-ordination and dispensing system for coordinating the administration of medication regimens at home equipped with a system for monitoring patient compliance and protection from overdosage and underdosage. The system is accessible to all types of patients, including children, the elderly, the visually-impaired, the hearing-impaired and patients with other handicaps. The device comprises a centrally positioned main housing containing a control element, a plurality of storage and dispensing units dedicated to different medications engageable with the main housing, and a system of input and output devices in communication with the control element. The I/O devices include visual and audible alarms for alerting the patient of administration times, voice and display means for providing extended medication information to the patient, a mini-camera for recording patient compliance and a user-wearable message receiving component for doing same. The compliance, co-ordination and dispensing system of the invention automatically dispenses medication according to a prescribed schedule but has built-in features which, in addition to recording non-compliance, allows inter alia adjustment of the medication criteria to protect against overdosage, as well as underdosage and preferably double-checks on the patient taking the dispensed medication and records and tracks when the medication is taken and co-ordinates this information with the medication regime programmed into the system.

26 Claims, 6 Drawing Sheets

MEDICATION COMPLIANCE, CO-ORDINATION AND DISPENSING SYSTEM

TECHNICAL FIELD

The present invention relates to systems for coordinating the administration of medication regimens at, for example, home away from the support system of a hospital or pharmacy, and without the day-to-day supervision of medical personnel. More specifically, the present invention is directed to improvements which allow the systems to be more accessible to all types of patients, including, for example, the elderly, children, the visually-impaired, and the hearing-impaired. The improvements include new mechanisms and operating processes which protect the user from overdosage and underdosage, and provide assurances of patient compliance. The present invention also relates to a user-wearable, message receiving or generated component, for example, a special wrist watch, of a compliance, co-ordination and dispensing unit, remote from the main unit of the coordinator but in communication with its safety and compliance systems.

BACKGROUND ART

Medication compliance systems and associated medication dispensing devices, and their equivalents, are known in the prior art. These systems are used for overseeing and coordinating the administration of medication regimens. Present systems function primarily to remind the patients when to take a particular medication and to automatically dispense that medication in accordance with a prescription schedule. Integration of CPU-based microprocessors into the compliance, co-ordination and dispensing system hardware has allowed the most recent systems to handle even more complex regimens, often involving multiple medications and administration criteria. These systems are particularly directed to coordinating and administering a complex medication regimen at home, outside the support of a hospital or pharmacy.

Critical to the effectiveness of a compliance, co-ordination and dispensing system is a method of assuring the care-giver that a patient is complying with the administration regimen. Moreover, the medication compliance and dispensing system should provide some protection from overdosage and underdosage. Generally speaking, prior art compliance and dispensing systems are able to regulate dosage and frequency according to administration criteria stored in the internal memory of the device's control subsystem. These devices can often provide a record of the administration history, which a care-giver can later review for patient compliance or non-compliance. Some medical dispensers provide protection by restricting patient access to medication only in accordance with a prescription schedule.

As the health care industry continues to change, the importance of self-administered medication regimens will also continue to increase. This increase challenges the adequacy of existing compliance and dispensing systems in meeting the demands of a wider variety of patient needs and even more complex medication regimens.

It is now apparent that the compliance and dispensing systems in the prior art are limited in use by certain members of the patient populations, particularly those with special needs, such as children, the elderly, the visually-impaired, the hearing-impaired and patients with failing memory. With respect to these subpopulations, it is imperative to provide compliance, co-ordination and dispensing systems and medical dispensers which feature further assurances of compliance and greater protection from overdosage and underdosage. The increased popularity has also created a demand for compliance, co-ordination and dispensing systems which are more convenient to use and more conducive to the lifestyle of any type of patient.

Typical of present systems, U.S. Pat. No. 5,329,459, issued to Kaufman et al, and U.S. Pat. No. 5,159,581 issued to Agans, disclose an interactive medication dispenser capable of storing and dispensing a plurality of medication, reminding the patient of administration times, and discriminating between the different categories of medication stored, as well as the different schedules of medication administration. These prior art approaches include a housing for storage and dispensing of a plurality of medication on demand from a programmable control element integrated with the device. The CPU-based control element communicates with internal memory containing medication administration criteria, a medication delivery system and output devices which send audible or displayed messages to the patient or care-giver, including a speech output means, a visual display and other control signal devices.

The approach disclosed in U.S. Pat. No. 5,291,191, issued to Moore, is intended to improve access by the visually-impaired to such a medical dispenser. The Moore approach dispenses medication according to a prescription schedule. When a medication is dispensed, the device selectively broadcasts an audible description of the specified medication. The invention includes a housing, an saudible broadcast means, and switch means for regulating access to a predetermined storage compartment and causing a sound playback means to broadcast a message associated with that compartment.

Moore also teaches designing the cabinet of the housing such that the compartments slide downwardly from the closed position to an open position, and whereby gravity defines the urging means. When individual switches are closed or opened via a control system, in accordance with a prescribed schedule, access to the compartment containing the subject medication is allowed. When the compartment is actually opened, e.g. by the patient, another switch causes the control element to broadcast or display a specific message associated with that medication.

A first problem recognized in the above-described prior art is that the dispensing devices eject medication automatically according to a timed sequence or schedule, but do not provide assurances that the medication was taken, and, if taken, when the medication was taken. In this regard, the devices do not provide adequate protection against both underdosage and underdosage. If the patient fails to take the medication according to schedule, the system continues to dispense medication at set intervals under the false assumption or premise that the patient took previous medications accordingly. Such a situation greatly enhances the risk of underdosage—the patient takes less than is prescribed. An equally critical situation arises if the patient takes the medication not according to schedule, but long after it is dispensed. If the patient takes the medication too close to the time for taking the subsequent medication, the patient is in danger of overdosage.

An attempt to provide some of the protection and assurances lacking in the prior art is evidenced in U.S. Pat. No. 5,392,952 issued to Bowden. Bowden '952 is another medication dispensing system for providing specific doses of medication in accordance with a pre-determined schedule. The device is specifically targeted for use by the elderly, the visually-impaired, the hearing-impaired and the disabled, and for prevention of overdosage. The system provides information regarding the medication regimens of the patient and specific instructions associated with each medication, including dosage, whether to take with water or food, and whether it is necessary to refill any of the medication supplies. The Bowden system also monitors and records compliance, or non-compliance, by the patient, with the compliance information then made available to a care-giver for review.

As with the previous devices, the Bowden approach includes a plurality of compartments for storage and dispensing of medication and a control element for receiving and storing medication administration criteria, e.g. the time periods for dispensing medication and specific instructions associated with each medication. The control element also actuates the display and broadcast of messages to either the care-giver or the patient. In Bowden '952, overdose protection is provided by a mechanism and operation for retrieving pills which are delivered but not removed from the dispenser within a specified time period. The previously dispensed pills are restocked in the device's storage area.

One problem with Bowden '952, however, is that the prescribed medication can be dispensed on demand, thereby allowing the patient to continue to press a button for multiple dosage at the same time. This is especially a problem for a patient with limited manual dexterity. Such a patient is susceptible to inadvertently requesting multiple dosage at once, thereby interrupting and thus invalidating the prescription schedule. In addition, someone besides the patient could gain unrestricted access to the medications as well.

Another deficiency in Bowden '952, and common to present pill dispensing devices, is that the dispensing apparatus dispenses into a common drawer or tray. When multiple medications are dispensed, or when multiple medications have gathered in the tray, a patient is forced to discriminate between the pills, for example, when administering instructions differ between the pills. A visually-impaired patient finds this task difficult if not impossible. When the pills are identical in color, shape or form, as are many forms of medication, even a patient with some visual acuity will find the task just as challenging.

Although Bowden '952 is specifically directed at providing a compliance system and medical dispenser with improved protection from overdosage and some assurances of patient compliance, existing systems are still lacking.

However, the present invention, in contrast, provides a compliance, co-ordination and dispensing system embodying the desirable aspects of recent technology, but introduces new mechanisms and operations which provide additional assurances of patient compliance and greater protection from overdosage and underdosage. The improvements are necessary in order for these health care devices to effectively service the elderly, the visually-impaired, the hearing-impaired, the mentally ill, and others with handicaps.

Because of the increased complexity of medical regimens, it is also desirable for a compliance and dispensing system to provide more extensive and more accessible information on the medications and their administration. The Moore '191 and Bowden '952 devices give limited information regarding dosage, dosage times, how to take the medication and supply status to the patient.

However, the present invention preferably provides administering instructions, information on side effects, precautionary measures, symptoms to watch and when the patient should call a doctor. Moreover, such information is be accessible, in one form or other, to the variety of patients to which the present invention is directed. The present invention's compliance, co-ordination and dispensing system preferably also provide means for communicating the information to the care-giver, and to the patient when he/she is not in the vicinity of the device.

There is also a need to provide compliance systems which are more convenient to use in the home and more conducive to the lifestyle of the patient. Although it is known in the prior art to provide a portable medical dispenser, such systems remain heavy and bulky, and are impractical to carry around with the patient, as that patient goes about in his/her normal routine. For the compliance and dispensing system to be effective, the patient must be in the near vicinity to hear or see the alarms. This, of course, is burdensome, since the patient will need to leave the home or frequent other parts of the home far from the device.

Finally, despite recent developments in medical dispensing devices for the home, prior art systems are further limited in that they are not capable of dispensing medication in liquid form. Regardless of complexity, it is common, if not essential, for medication regimens to include liquid medication. Thus, a system for coordinating and administering complex medical regimens in the home, provided with assurances of compliance and protection from overdosage and underdosage, would not be complete without liquid dispensing capability. It is one object of the present invention to preferably provide such a capability in a compliance, co-ordination and dispensing system.

A list of prior patents which may be of interest is provided below:

| U.S. Pat. No. | Inventor(s) | Issue Date |
| --- | --- | --- |
| 5,400,301 | Rackley | 03/21/95 |
| 5,392,952 | Bowden | 02/28/95 |
| 5,367,505 | Tsuchiya et al | 11/22/94 |
| 5,329,459 | Kaufman et al | 07/12/94 |
| 5,291,191 | Moore | 03/01/94 |
| 5,159,581 | Agans | 10/27/92 |
| 4,785,981 | Rodman | 11/22/88 |
| 4,462,696 | Yung et al | 07/31/84 |
| 4,147,021 | Kondo | 04/03/79 |

It is noted that some of the above patents are directed to wristwatches that include an alarm of one type or another for, for example, reminding the wearer to take medication, noting for example, the Rackley '301 patent; and one watch which includes a vibration based alarm, noting, for example, the Tsuchiya et al '505 patent. However, there is suggested no co-ordination of such a watch with a separate medication compliance, co-ordination and dispensing system.

GENERAL, SUMMARY DISCUSSION OF INVENTION

The present invention is directed to curing specific deficiencies in prior art medication compliance systems and/or medication dispensing systems. More specifically, the invention is directed to providing a compliance, co-ordination and dispensing system which provides greater assurances of patient compliance and protection from overdosage and underdosage. The invention provides improvements necessary in order for these home health care systems to effectively service all patients, but particularly those with special needs, such as children, the elderly, the visually-impaired, the hearing-impaired and patients with failing memory or other handicaps. Finally, the present invention is also directed to providing a compliance, co-ordination and dispensing system which is more convenient to use in the home environment and more conducive to the normal lifestyle of any patient.

As will become readily apparent, there are significant structural and operational differences between the compliance, co-ordination and dispensing system of the present invention and the compliance dispensers of the prior art.

Structurally, the present invention comprises a cabinet preferably defining a centrally located, free-standing main housing unit and two rows of smaller individual units arranged on two opposite sides of the main unit and engageable with the main unit. Each of the smaller individual units function independently to store and dispense a medication and are referred to as "dispensers."

The main unit houses the common components of the compliance, co-ordination and dispensing system, including a control element primarily responsible for operating the control system, a power supply, a computer-generated voice means and a front panel. The front panel features a digital clock, a speaker associated with the computer-generated voice means, an audio alarm, a visual indicator and, in the preferred embodiment, the wide-angle lens of a mini-camera or video recorder.

A typical dispenser comprises a substantially vertical, sometimes cylindrical housing. A front surface is provided with a flat panel for containing a digital display means, a visual indicator, i.e. a visual alarm indicator such as a flashing bulb or the like, and a dedicated surface for attaching typed instructions or, in an alternative embodiment, for embedding braille instructions. Physically engageable with adjacent dispensers and/or the main housing, each dispenser is electronically connected to the control element.

In a preferred embodiment of the invention, the dispenser is dedicated to storing and dispensing one type of medication in the pill form. The pills are stored in an upper storage area. Upon actuation by the control element, a dispensing mechanism delivers the required number of pills into a receiver located below the storage area by way of urging means or by gravity. The delivered pill passes through the receiver and into a chute, which guides the pill to a small compartment area near the chute's bottom point or end. There, the pill rests against the inside of a hinged trap door, awaiting removal by the patient.

The patient gains access to the dispensed pill by opening the hinged trap door to the pill compartment. Switch means are associated with each trap door such that, when the door is opened, the switch is closed and, when the door is shut, the switch is open. Because the switch means is electrically connected to the control element, the switch status is known at all times, and any change is automatically recorded and stored in internal memory. Thus, the compliance, co-ordination and dispensing system is able to record not only the time when a particular medication is dispensed, but also the time when the medication is removed from the dispenser. The realization that the two events—dispensing of medication and removal of the medication—may differ greatly in time and monitoring and accounting and adjusting therefor is unique to the present invention.

In an alternative embodiment of the compliance, co-ordination and dispensing system, one or more of the dispensers are modified for storage and dispensing of medication in the liquid form. The liquid dispenser, however, retains the same control and protection features associated with pill-type dispensers.

The control element controls the dispensing function, activates alarms, indicators and other electronic devices, and receives, processes and sends information between patient and care-giver. In the preferred, exemplary embodiment, physically, the control element communicates with an external CPU, various input and output devices located on the main unit and on each storage unit, and additional output devices including a printer, a mini-camera or video recorder, and a user-worn message receiving device such as a digital beeper or a specially-designed, vibrating wristwatch. It may also communicate with a remote monitoring facility or care-giver via a modem or other communication link.

The control element is equipped with programmable or variable, static, internal memory which is used to store user-inputted medication administration criteria, a program for generating prescription schedules and a control logic program associated with operation of the control system for the compliance, co-ordination and dispensing system. The internal memory also stores medication information, administration instructions, and patient compliance history.

An important feature of the invention is the control element's ability to generate updated prescription schedules for each medication in the regimen during use, without requiring additional user input and programming. The control element automatically runs the schedule program in response to updated information on patient compliance or non-compliance and actual times for taking prescribed medication, i.e. removal of the medication from the dispenser. The program runs checks on the frequency of administration and patient compliance, compares it with the earlier prescription schedule and compares administration history with the individual medication administration schedules and criteria in the regimen. The latter check ensures that the patient does not take a combination of medications which may cause harm if taken too closely together.

A basic function of the control element is to discriminate between the individual dispensers and the different medication contained therein. The control element actuates the individual dispensing mechanisms according to the medication administration criteria, i.e. according to a constantly updated prescription schedule.

The control element also operates the alarms and indicators of the compliance, co-ordination and dispensing system. When it is time for the patient to take a particular medication, the control element activates an alarm or indicator via control signals.

In the preferred embodiment of the invention, bright, flashing indicators or flashers located on each dispenser are activated. Alternatively, a variety of audible alarms, for example, a beeper or the like, could function with or in lieu of the visual indicators.

When the patient removes a pill from the pill compartment, the control element causes the appropriate alarm to be deactivated and a computerized voice message to be broadcasted. The message provides extended information on the medication, including brand and dosage, as well as instructions regarding what to take with the pill, possible side effects and precautions, symptoms to watch for, and when to call the doctor. Alternatively, the same message may be displayed on the digital display means of the front panel of the appropriate dispenser.

The compliance, co-ordination and dispensing system can also alert the patient or care-giver when refills of the dispensers are necessary. In the preferred embodiment, a visual indicator located on the front panel of the main housing is activated by the control element when a particular dispenser has only, for example, five days supply of medication left. The control element simultaneously activates another visual indicator, audible alarm, or message display, at the appropriate storage unit to direct the user.

A unique feature of the compliance, co-ordination and dispensing system is an integrated mini-camera or video recorder. This feature provides additional assurance of patient compliance by recording the patient receiving and/or actually swallowing the medication. The camera is activated by the control element at the time of administering medication or when a dispenser trap door is opened. In the preferred embodiment, the lens of the camera is located on the front panel. Alternatively, the camera may be mounted remotely from the main unit, strategically positioned so as to capture the patient self-administering the medication. For example, the camera may be equipped with a wide angle lens and mounted at the far end of the patient's kitchen, away from the main unit of the compliance, co-ordination and dispensing system.

Another unique feature of the system is, inter alia, a user-wearable message receiving device such as a digital beeper or a specially-designed, programmable wristwatch, integrated into the system and in communication with the control element. In the preferred embodiment the watch includes a clock display, vibrating means, and audio alarm means. In either case, the watch or beeper is programmed in conjunction with the control element. In the case of a beeper, the control element may communicate with a commercial transmission service by modem. Alternatively, the control element is provided with transmission means for directly communicating with the beeper or wristwatch by, for example, using a bar code type display incorporating the requisite information on the dispenser unit with a bar code reader in the wristwatch using known technology currently used in personal computers with co-ordinated, information containing wristwatches. Typically, the patient will be alerted at medication administration times.

It is a general object of the invention to improve overall patient outcome and to reduce the overall health costs related to outpatient care.

It is a further object of the invention to increase the patient's compliance with medication regimens.

It is still a further object of the invention to provide for a compliance, co-ordination and dispensing system which will substantially reduce, if not eliminate, over-utilization and under-utilization of prescription drugs through confirmable, tracked dispensing of accurate quantities of medication at the appropriate times.

It is still a further object of the invention to provide a compliance, co-ordination and dispensing system which can be used by all types of patients, including children, the elderly, the visually-impaired, the hearing-impaired, and patients with failing memory and other handicaps.

It is still a further object of the invention to provide a compliance, co-ordination and dispensing system which is simple, user-friendly and reliable.

BRIEF DESCRIPTION OF THE DRAWINGS

For a further understanding of the nature and objects of the present invention, reference should be had to the following detailed description, taken in conjunction with the accompanying drawings, in which like elements are given the same or analogous reference numbers and wherein:

FIG. 1 is a front view of a first, preferred, exemplary embodiment of the medication compliance, coordination and dispensing unit of the present invention, showing a main unit and an exemplary six dispensers, and a sampling of the associated alarms, indicators and output devices which can be integrated into an embodiment of the invention; while

EXEMPLARY MODES FOR CARRYING OUT THE INVENTION

The exemplary, currently preferred embodiment of the compliance, co-ordination and dispensing system 1 of the present invention comprises a main unit 10, a control element 30 located inside the main unit 10, and an exemplary six individual storage and dispensing units (hereinafter referred to as "dispensers") 50 arranged in two rows on either side of the main unit 10 and engageable with the main unit 10. Accessories include a mini-camera or video recorder 95 actuatable by the control element 30, voice generating means 32, attached printer 200 and a remote, user-wearable, message receiver 100 such as a programmable digital beeper or wristwatch (note FIG. 5), either in direct communication with the control element 30 or programmed in conjunction with the control element 30.

The specific configuration of the compliance, co-ordination and dispensing system 1 is modifiable to accommodate the specific needs of the patient. Typical modifications include increasing or decreasing the number of dispensers or altering the shape and capacity of the dispenser to accommodate a variety of medication types and forms. In an alternative embodiment of the invention, one or more dispensers are designed to store and dispense medication in the liquid form (note FIG. 4). For patients with special impairments, additional alarms and indicators may be added to the compliance, co-ordination and dispensing system's control sub-system. A compliance, co-ordination and dispensing system for a visually-impaired patient, for example, may utilize voice generating means, several audible alarms and surface panels for embedding medication information and instructions in braille.

I. Structure of the Preferred Embodiment

Figure 1:
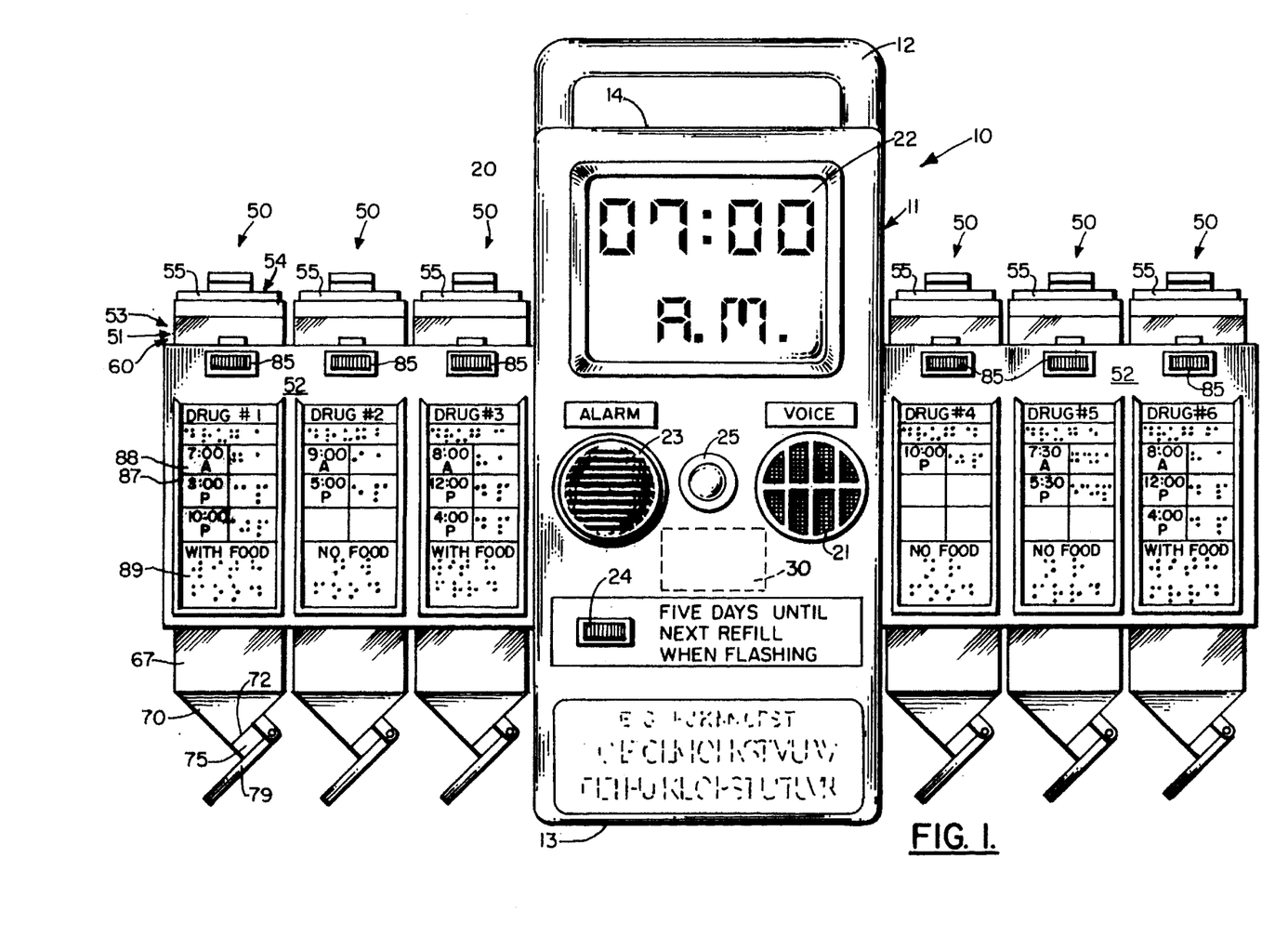
Figure 2:
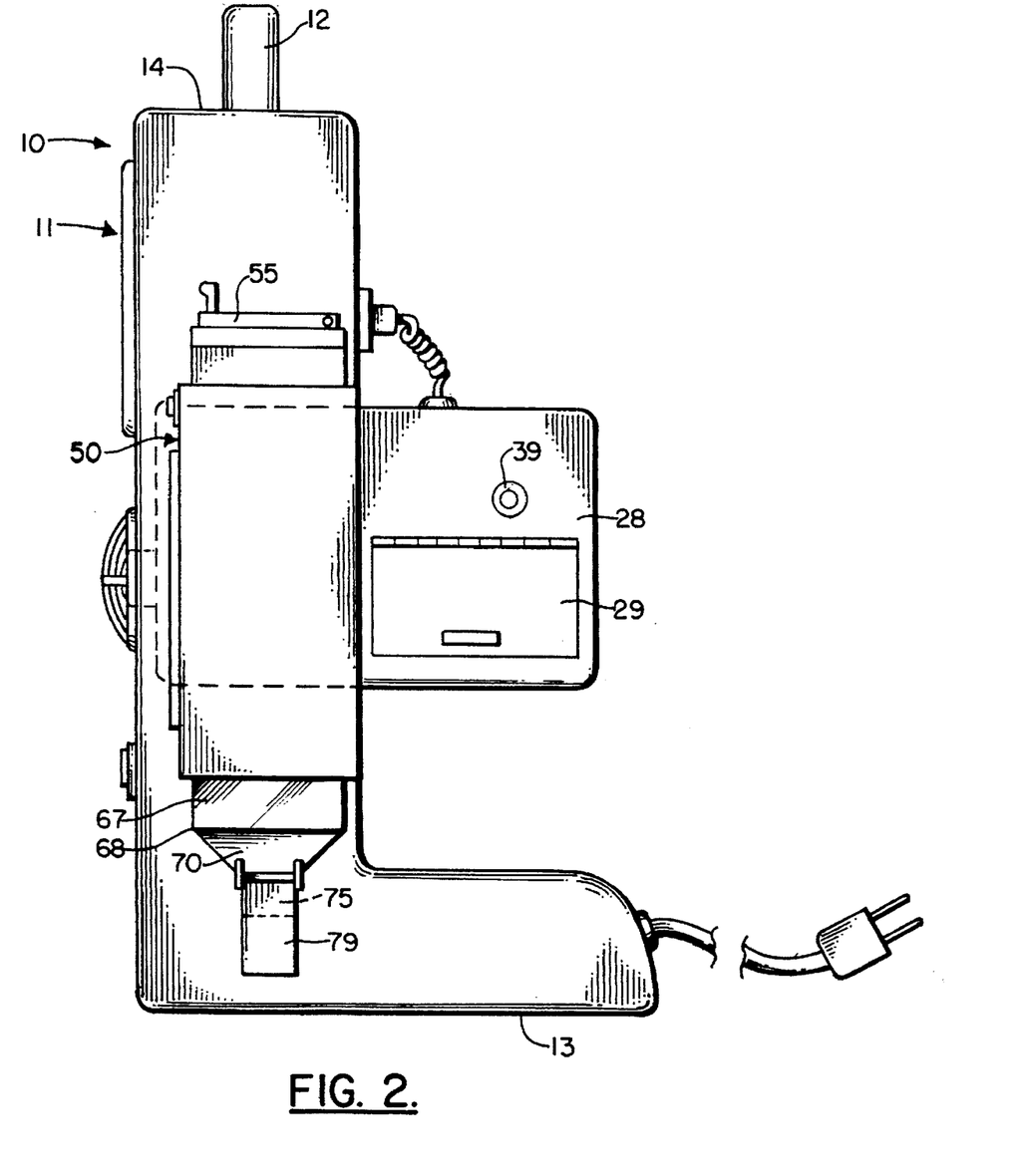
FIG. 2 is a side view of the main unit of FIG. 1.

An exemplary, preferred embodiment of the compliance, co-ordination and dispensing system 1 is shown in FIGS. 1 and 2. The main unit 10 functions as the structural and operational center. The main unit 10 comprises a substantially vertical housing 11 having four vertical side walls, a flat rectangular bottom surface 13 upon which the weight of the unit 10 is supported and balanced, and a matching flat rectangular top surface 14. A handle 12 attached to the top surface 14 allows the compliance, co-ordination and dispensing system unit 10 to be easily lifted and transported. On the rear side wall 21, a hinged access door 55 facilitates access to the inside of the main unit 10. The door 55 is primarily used during maintenance procedures and for accessing the control element 30 and other internal hardware.

The front, vertical surface 20 of the main unit 1, is referred to as the "main control panel" 20, on which a plurality of alarms and indicators are attached. The main housing 11 encloses the control element 30 (shown in general, schematic form), the mini-camera 95, a power supply 31, and voice generating means 32. The power supply 31 may be, e.g., a DC power supply or an AC/DC converter.

The voice generating means 32 can be, for example, any of the conventional computerized voice synthesizers known in the art. Alternatively, the voice means 32 may be replaced by a sound playback means such as a mini-cassette player operable by the control element 30. A speaker 21 associated with the voice means 32 is located on the front panel 20 of the main housing 11.

The control element 30 is the functional center of the control sub-system of the compliance, co-ordination and dispensing system 1. The control element 30 comprises a microprocessor 35, internal memory 45, a distribution panel 37 and various communication means 41. Internal memory 45 is used to store, e.g., medication administration criteria, patient compliance history, a schedule program and a control logic program for operation of the control system.

The microprocessor 35 runs the programs stored in internal memory 45. Control signals travel by way of the distribution panel 37 to and from various I/O devices featured in the compliance, co-ordination and dispensing system 1.

Figure 5:
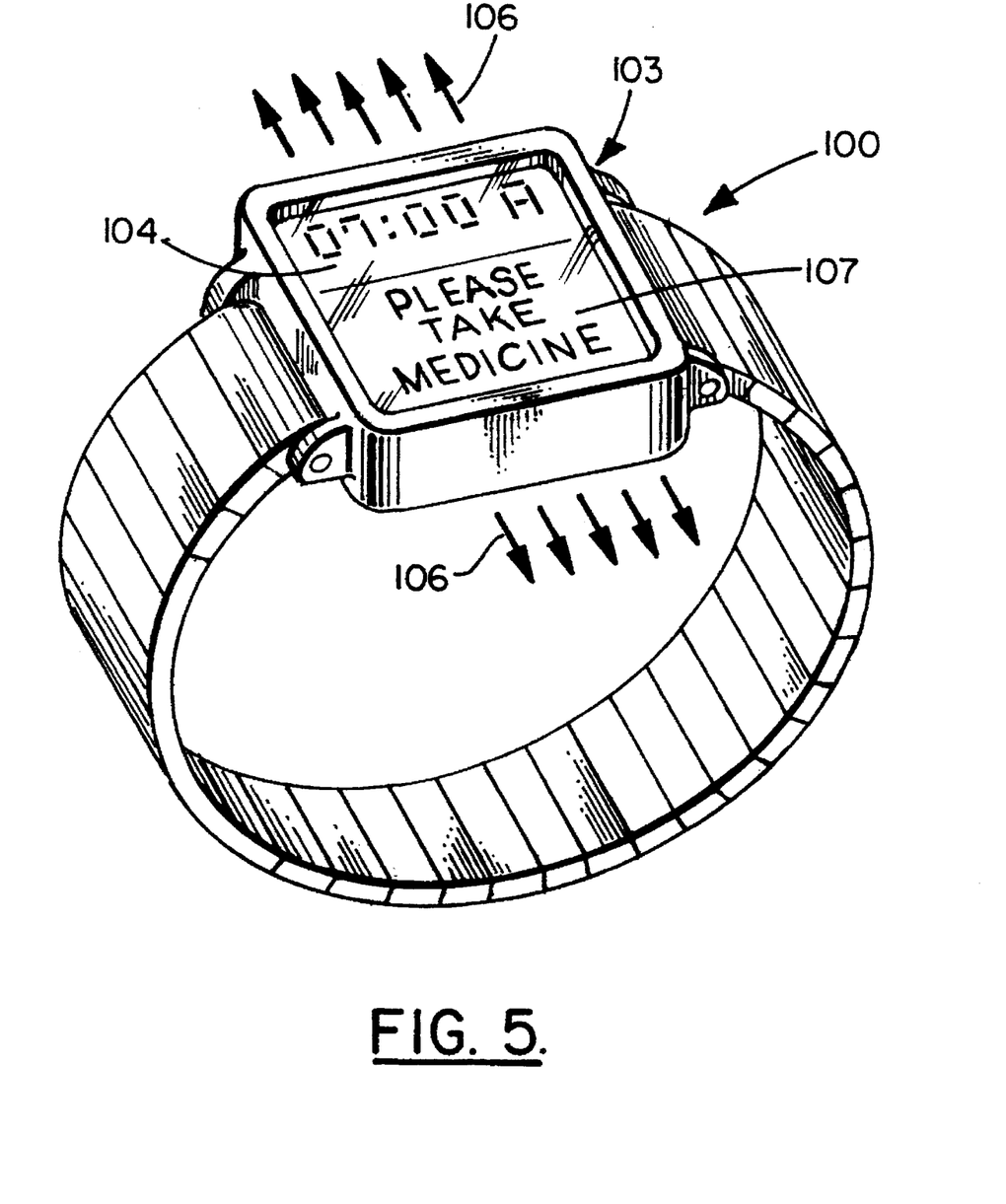
FIG. 5 is a top, perspective view of an exemplary wristwatch with vibrating and display capabilities, which can be used in combination with, for example, the units of FIGS. 1 & 4.
Figure 6:
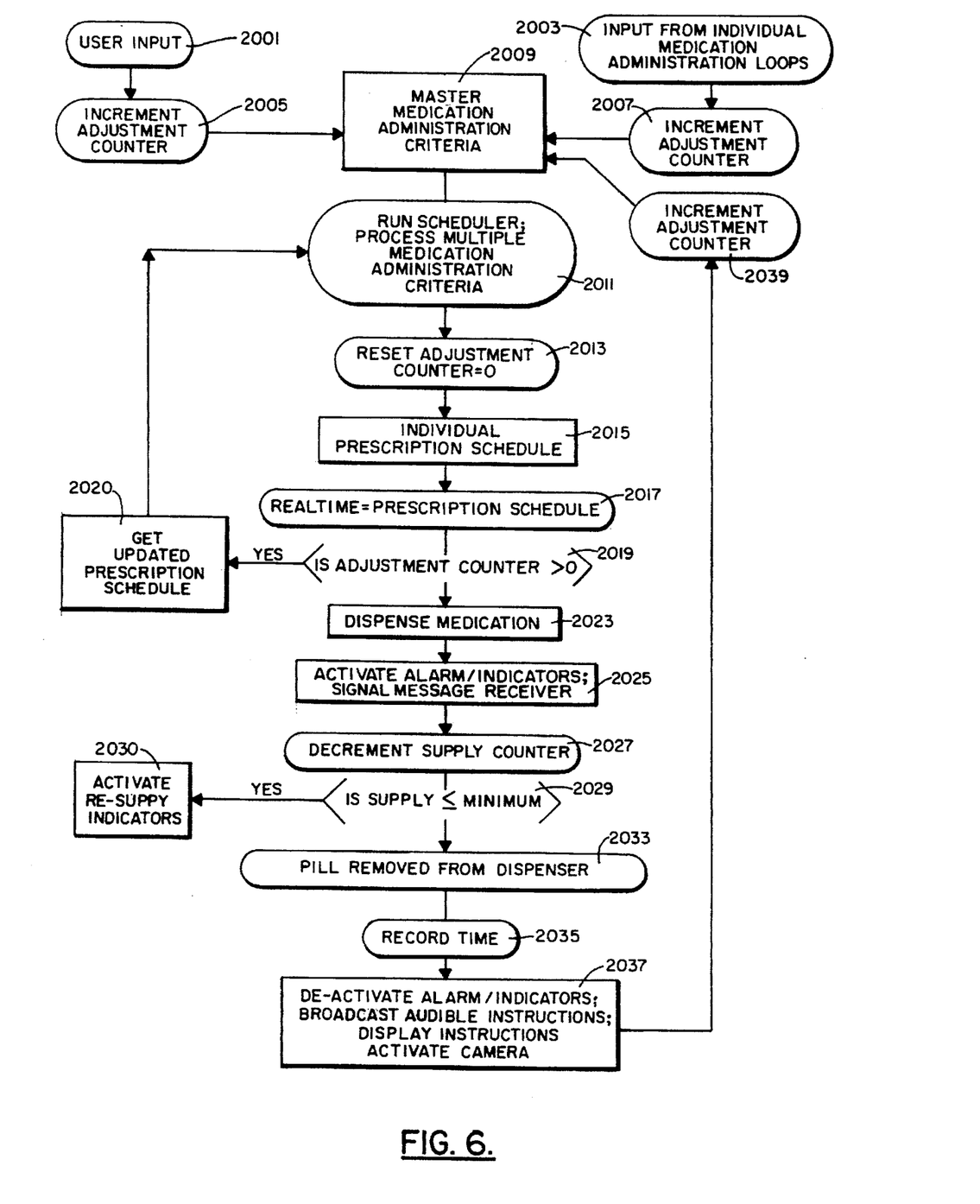
FIG. 6 is a flow chart, logic diagram representing an exemplary, preferred process of dispensing medication according to updated prescription schedules generated by an exemplary schedule program which can be used in conjunction with the system of the present invention, for example, the main unit of FIGS. 1 & 2.

Communication means associated with the control element include ports 39 for communicating with an external CPU 41, a keypad 42 and a modem 43. In an alternative embodiment, the control element also includes a signal transmission means 38 for communicating with a user-wearable, message receiving device 100 (FIG. 5).

Figure 3:
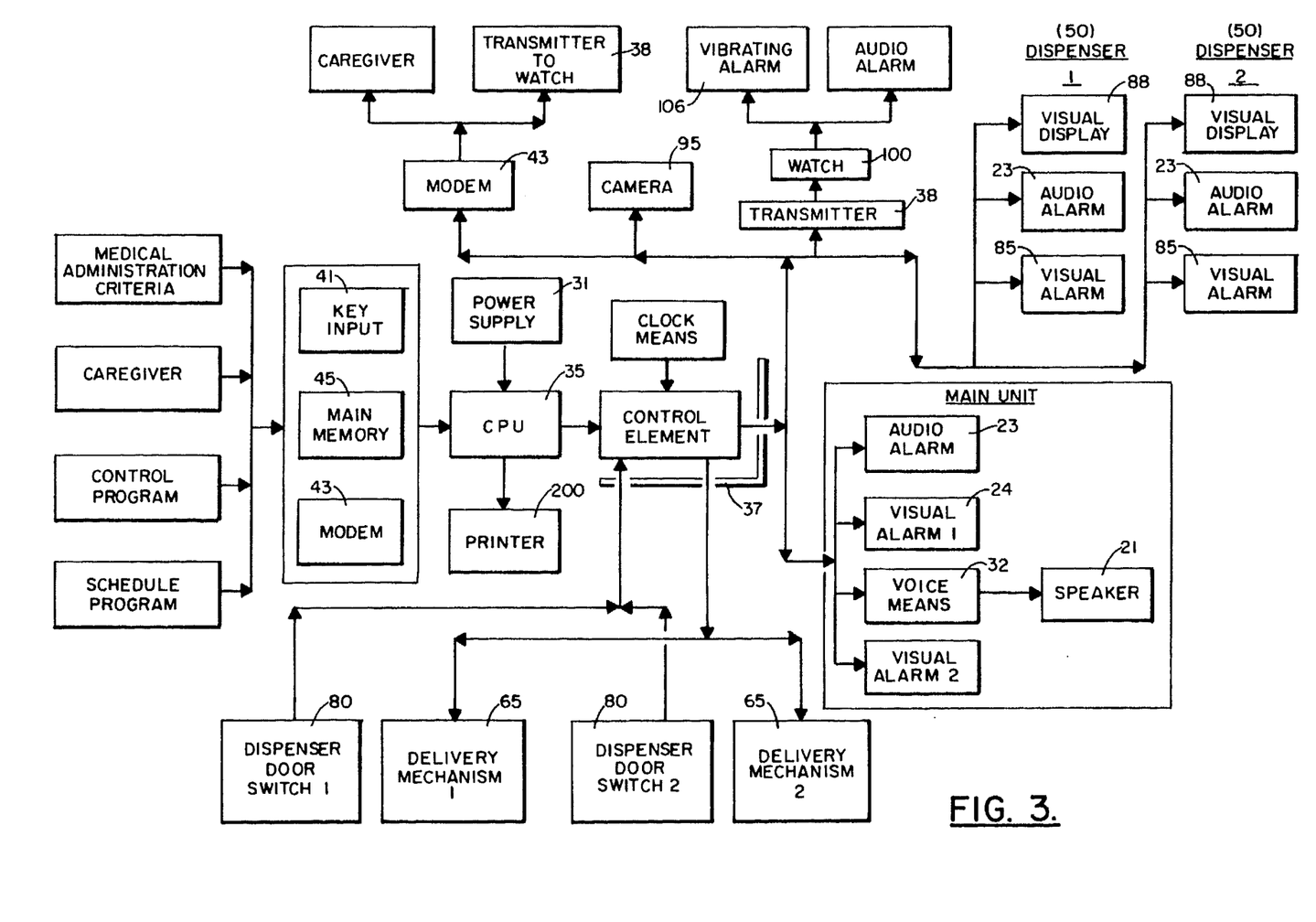
FIG. 3 is a schematic, block diagram showing an exemplary embodiment of the control system of the medication compliance, coordination and dispensing system of the present invention, including the control element, I/O devices and various communication means.

The control element 30 may be a programmable logic controller or equivalent. To load a new program, or to modify or test an existing program, the control element 30 can be accessed by, e.g., directly connecting a CPU 41 to a communication port or by modem 43 from a remote central monitoring facility. The block diagram of FIG. 3 further illustrates the components of the control system—the control element 30 and its capability of communicating with various I/O devices.

In the preferred, exemplary embodiment, the main front panel 20 is adapted with a variety of alarms and indicators. The first indicator is a digital clock/timer 22 with AM/PM designation 22 located near the top handle 12 of the main unit 10. The clock/timer 22 displays the time for the user's benefit, but also provides the control element 30 a real time input for control operations.

Below the clock/timer 22, on the central portion of the front panel 20, are an audible alarm 23 and a visual indicator 24. The audible alarm 23 may be a conventional "beep" alarm or siren which is activated at each medication administration time. The visual indicator 24 is, for example, a flashing blue light bulb or flasher activated to alert the user when the supply of a particular dispenser 50 falls below a predetermined minimum threshold, e.g. five days of supply.

To direct the user to the appropriate dispenser 50 requiring resupply, another indicator means is activated at the dispenser 50.

Two devices are provided on the main front panel 20—a speaker 21 for the voice means 32 output and an eye or lens 25 for the mini-camera 95. The speaker 21 is used to broadcast messages and instructions created by the voice means 32 upon demand from the control element 30. The mini-camera 95 is triggered by the control element 30 when a pill is removed from one of the dispensers 50. To ensure that the patient is captured in a picture, the lens 25 is typically of the wide-angle type.

Alternatively, the mini-camera 95 may be located remotely from the main unit 10, connected by electronic cable. Thus, the mini-camera 95 may be strategically positioned so as to capture a wider and more complete view of the patient taking the medication. For example, the compliance, co-ordination and dispensing system unit 10 may be located in the patient's kitchen and the mini-camera 95, equipped with a wide-angle lens, may be mounted on the far end of the same kitchen. In such a setup, the mini-camera 95 is capable of capturing a panoramic view including the patient, the compliance, co-ordination and dispensing system unit 10 and parts of the kitchen where the patient may consume the medication with water or food.

In an alternative embodiment, the mini-camera 95 is replaced or supplemented by a conventional video camera. Furthermore, the video camera 95 may be equipped with means for transmission of live pictures to a remote monitoring facility.

Each dispenser 50 comprises a substantially vertical self-contained housing 51 having four side walls and two horizontal end sections. The top section 53 contains a loading area 54 which includes a top-opening hinged door 55 (the "loading door"). The loading door 55 provides access to a storage area 60 contained by the housing 51 and located near its top end 53. Each dispenser 50 further includes an independent delivery mechanism 65 located inside the housing 51 and associated with the storage area 60, a receiver 67 directly below the storage area 60, a chute 70 connected to the lower edge 68 of the receiver 67 and a pill compartment 75 adjacent to a lower portion of the chute 70.

To prevent abuse, the loading door 55 may be equipped with a conventional lock 56 to restrict access and prevent override of the compliance, co-ordination and dispensing system's safety features. A matching key may be issued to the care-giver or other responsible person depending on the circumstances. The responsible person may load new supplies of medication into the storage area 60 of the dispenser 50 through the loading door 55.

Thus, each dispenser 50 includes independent storage means 60 and an independent delivery mechanism 65 associated with the storage means 60. Upon receiving a control signal from the control element 30, the delivery mechanism 65 delivers a predetermined number of pills from the storage area 60 and into the receiver 67. In the preferred embodiment, urging means (not shown but well known) triggered by the control signal and aided by gravity, expels the pill from the storage area 60 into the receiver 67. Gravity causes the expelled pill to travel further through the receiver 67 and into the chute 70, where it is guided into the small pill compartment 75 to rest.

The pill compartment 75 is formed from an opening 72 on the lower portion of the chute wall and three side walls 76, 77, 78. The downwardly-facing wall 78 opposing the chute opening 72 is the largest of the three walls 76, 77, 78 of the pill compartment 75 and includes a hinged, trap door 79. Switch means 80 is associated with each trap door 79 such that when the trap door 79 is opened, the switch means 80 is closed.

In the preferred embodiment, the front wall 52 of the six dispensers 50 is utilized for attaching alarm and display means. The first indicator positioned near the top edge of the wall 52 is a red flashing light, or flasher 85. This flasher 85 is activated by the control element 30 to alert the patient whenever it is time to take the medication contained in that dispenser. At that time, the dosage has been delivered to the pill compartment 75, where it awaits removal by the patient.

Below the red flasher 85 is the dispenser display panel 87. One portion of the panel 87 is dedicated to an electronic display means 88 such as an LCD display, digital display or the like, through which information related to the medication is communicated to the patient. In the preferred embodiment, the display means 88 is utilized to display user-defined information regarding drug type, specific administration instructions, symptoms, warnings signs, physician and pharmacy information or refill instructions. As shown in FIG. 1, the other half of the display panel 87 is dedicated to a surface 89 for attaching similarly printed or braille messages.

Figure 4:
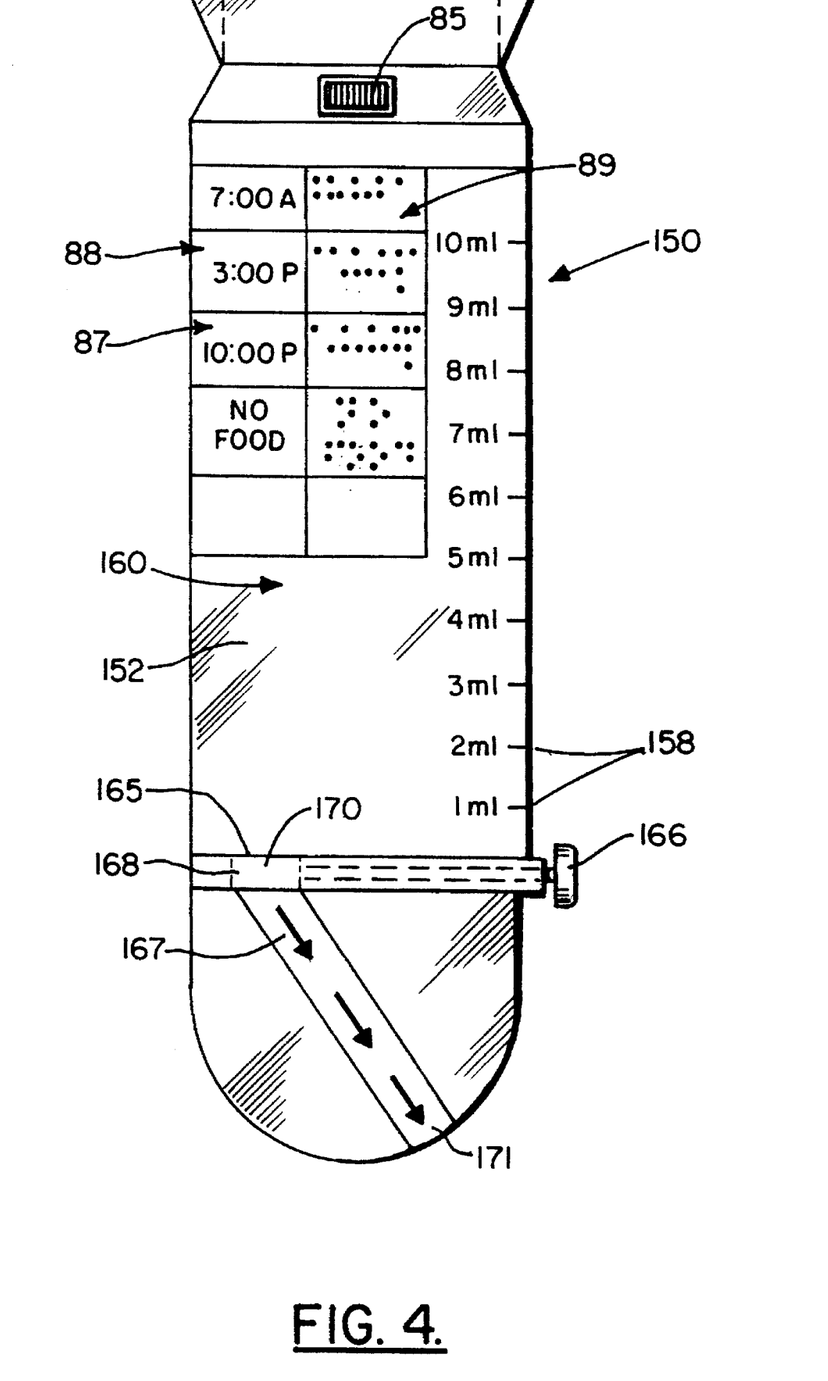
FIG. 4 is a front view of a second, exemplary embodiment of the compliance, coordination and dispensing system of the present unit designed to dispense liquid medication.

FIG. 4 shows a dispenser for storing and delivering medication in the liquid form. The liquid dispenser 150 is constructed mainly of a nearly transparent material such as plastic or glass having a substantially cylindrical shape.

On the front surface 152 of the liquid dispenser, raised graduated indications 158 are provided so that the patient or care-giver can determine the volume contained in the dispenser 150 or the volume of medication prescribed. As with pill dispensers of the preferred embodiment, the liquid dispenser 150 comprises a storage means 160, an independent delivery mechanism 165 and a liquid receiver 167.

A conventional flow control means such as a combination flow meter (not shown but well known) and control valve (not shown) may be positioned at the entrance 168 into the receiver 167. The control element 30 may then cause the control valve to open according to a prescription schedule generated by the medication administration criteria.

The flow metering means provides accurate measurement of dosage and communicates the measurements to the control element 20. Alternatively, the volume of the liquid receiver 167 may be predetermined to hold the required dosage and equipped with valves at its entrance 170 and exits 171. To access the medication, the patient must depress a release button 166 located on the outside of the receiver 167 which closes a switch and sends a signal back to the control element 30.

Another important feature of the compliance, co-ordination and dispensing system is a user-wearable, signal receiving device 100, which is integrated into the compliance, co-ordination and dispensing system's control sub-system. The receiving device may be a digital beeper or the like, in communication with the control element 30. The control element 30 may be provided with signal transmission means 33 which activates the beeper 100 at the prescribed administration times. Using a conventional beeper 100 with vibrating and display means, the patient is alerted as to the time of administration and to the type of medication.

To provide forewarning, the patient may be alerted ahead of the administration time. Thus, if the patient is away from the home, he/she is given adequate time to return home to retrieve the appropriate medication from the dispenser.

In the preferred embodiment, the patient is provided with a user-wearable programmable wristwatch 100 specially designed for the compliance, co-ordination and dispensing system 1. As shown in FIG. 5, the head 103 of the wristwatch 100 includes a clock display 104, a vibrating means 106, and display means 107. In any case, the watch or beeper 100 is programmed comparable to and in conjunction with the control element 30.

II. Control Element Operations

The control element and internal memory is critical to the ability of the control coordinator to provide protection from overdosage and underdosage and to monitor patient compliance. Initially, the user downloads into internal memory medication information such as the types and brands of medication as well as administration instructions which are to be communicated to the patient by way of digital display or sound broadcast.

Medication administration criteria is also stored in internal memory. This body of information refers to specific administration instructions for each medication, including dosage and frequency of administration, as determined by the physician or care-giver. Information on all of the medications are inputted by the physician or care-giver into what is the Master Medication Administration Criteria. When this information is processed by the compliance, co-ordination and dispensing system's schedule program, prescription schedules are generated for each of the medications.

The medication administration criteria also provides program instructions which govern the inter relation between the different medications in the regimen, particularly how each of the medications impact administration of the others. For example, if it is desirable to take a particular medication in conjunction with another medication, the prescription schedules of the two medications are adjusted so that the two will be conveniently dispensed at the same time. Conversely, if the two medications should not be taken within a certain time period of each other, the two prescription schedules are adjusted accordingly. Taking into account all relevant factors, the medication administration criteria generates optimal prescription schedules for all the medications in the regimen.

Unique to the present invention, the program also allows for adjustments to be made on the prescription schedules as new information is received by the control element. These adjustments are made without requiring additional user input or programming. The first example is when medications are added or removed from the regimen; new prescription schedules are automatically generated to reflect the makeup of the new regimen.

The program also takes into account actual compliance or non-compliance activity by the patient. This is necessary because the time and date the medication is actually dispensed may differ greatly from the time and date it is actually removed from the pill compartment and self-administered by the patient. The control element records the actual administration time and sends it back to the administration criteria for later processing.

The prescription schedule of that medication and all other medication is then adjusted accordingly by the program. The schedule program makes two comparisons in this process. One, it compares the actual self-administration time for the subject medication to its prescription schedule so that the subsequent administrations are postponed if necessary. Two, the program compares the adjusted prescription schedule of the subject medication with the prescription schedules and administration criteria of the other medications in the regimen to determine if there are any conflicts between the administration criteria. The latter comparison may result in the program again adjusting either the subject medication's prescription schedule and/or the prescription schedule of one or more of the other medications.

The control logic program is associated with the operation of the compliance, co-ordination and dispensing system's control system and works in conjunction with the schedule program. Through the control logic program, the control element is able to discriminate between the individual dispensing mechanisms (thereby discriminating between the different medications), actuating the appropriate dispensing mechanisms in accordance with the prescription schedules.

The control system also includes various alarms, display means and audio broadcast means featured on the compliance, co-ordination and dispensing system. Their operation is coordinated by the control element in accordance with the control logic program. When a medication is dispensed, the control element activates the appropriate alarm or indicator by sending a control signal to that device.

In the preferred embodiment, flashers located on each dispenser are activated at the administration time. Alternatively, a variety of audible alarms, for example, a beeper or the like, may function in conjunction with, or, in lieu of, the visual indicators.

Of course, the use of audible alarms is particularly preferable when the compliance, co-ordination and dispensing system is used by a visually-impaired patient. Furthermore, alarms may be supplemented by a computerized voice message broadcast at time intervals beginning when the medication is dispensed and terminating when the medication is removed from the dispenser.

Through the control logic program, the control element also responds to signals from each of the switches associated with the individual dispenser trap doors. Upon closing of a trap door switch, as when the patient is removing a pill from the pill compartment, the control element causes the appropriate alarm to be deactivated. It also causes a computerized voice message to be broadcasted.

The message provides extended information on the medication, including brand and dosage as well as instructions regarding what to take with the pill, possible side effects and precautions, symptoms to watch for, and when to call the doctor. Alternatively, the same message may be displayed, in shortened form, on the digital display means of the front panel of the appropriate dispenser. Furthermore, the message can be repeated at any time, on demand, by conventional interactive means, i.e. a button located on the front panel of the appropriate storage unit.

Upon closing of each switch, i.e. removal of the medication from the dispenser, the control element stores the time and date, to indicate when that medication was actually self-administered. As mentioned, the data is used for monitoring patient compliance, creating a compliance history, checking for any significant discrepancies and adjusting the prescription schedule as necessary. Thus, the compliance, co-ordination and dispensing system of the present invention is capable of checking itself for both underdosage and overdosage.

As an optional feature, the control element can also communicate information to the care-giver via local display or at a remote location via modem. For example, the control system may be programmed to contact the care-giver's address upon the occurrence of a certain event such as when an important medication is not removed from the dispenser for a period after administration time (indicating the possibility of underdosage). The compliance, co-ordination and dispensing system may also generate and print historical summaries for the care-giver on an attached printer module on demand.

In another aspect of the invention, the control element uses information sensed by the control system to determine when refills of the dispensers are necessary. In the preferred embodiment, a visual indicator located on the front panel of the main housing is activated by the control element when only five days of medication supply remains in the storage area of a particular dispenser. The control element simultaneously activates another visual indicator, audible alarm, or message display, at the appropriate storage unit.

FIG. 5 is a flow chart, logic diagram representing an exemplary process (steps 2001–2039) employed by the compliance, co-ordination and dispensing system to update the prescription schedules of individual medications in the medication regimen prior to dispensing medication, activating alarms and checking the medication supply status.

Initially, the care-giver inputs a master administration criteria into the internal memory of the control element (2001). The master administration criteria contains information common to all medication (e.g. the number of different medications and dispensers in use) of the regimens as well as information specific to each medication or individual medication administration criteria. The medication criteria may contain additional information such as the following: dosage, appropriate time spans between administration of the subject medication, appropriate time spans between administration of the subject medication and administration of other medication in the regimen, maximum dosage over discreet periods, restrictions as to the periods of the day during which the medication can be taken, instructions on self-administration and other information relevant to the subject medication.

When the master medication criteria is processed by the schedule program (2011), an initial prescription schedule is generated for the subject medication as well as each of the other medications (2015). The prescription schedule dictates the time at which the subject medication is to be dispensed to the patient for self-administration. When real time equates to administration time (2017), however, the compliance, co-ordination and dispensing system first checks the validity of the prescription schedule with respect to current information before making the medication available (2019). This step is lacking in prior art systems wherein the prescription schedule is fixed and cannot be adjusted without user input.

In the preferred embodiment, the schedule program first determines whether any new information has been received by the master administration criteria since the subject medication's prescription schedule was last generated (2019). A counter is incremented each time a medication is dispensed or removed from the dispenser, or when the user modifies the master administration criteria, i.e. inputs new medication regimens. Such events generate new information which must be incorporated into the individual medication administration criteria. When the medication administration criteria is modified to include this new information, an "adjustment" is said to have been made.

If one or more adjustments have been made, the program loops back to reprocess the administration criteria and to generate updated prescription schedules (2020, 2011, 2015). The adjustment counter is also reset to zero (2013), indicating that the next prescription schedule encountered will be an updated one.

Sometimes, the updated prescription schedule does not return a new administration time but keeps the old time intact. In such a case, real time still equates to administration time and the program proceeds. The control element actuates the delivery mechanism to dispense the subject medication dosage from the storage area into the pill compartment (2023). Simultaneously, the control element activates the appropriate alarm on the dispenser front panel and the message receiving device, if that device is in use (2025).

The program also decrements the supply status for the subject medication (2027) and then, compares the remaining supply to the user-defined minimum supply threshold (2029). If the current supply falls below the minimum threshold, the control element activates the blue flasher on the main unit and displays a related message on the front panel of the appropriate dispenser (2030).

The counter for the supply status can be reset by the responsible person during resupply of the appropriate storage area. In the preferred embodiment, reset is accomplished by depressing a reset button located in the storage area either manually or automatically by virtue of a filled storage area.

Alarms remain activated while the subject medication is in the pill compartment. For systems with certain audio and visual alarms, the control element may be manipulated to activate the alarms only at delayed intervals (rather than continuously). When the patient opens the hinged trap door to remove the medication from the dispenser, the switch associated with the hinged door is tripped (2033) and the control element captures the actual time at which the pill is removed from the dispenser and stores it in memory (2035).

The tripped switch causes the control element to perform three operations (2037). First, the control element deactivates the alarms. Secondly, the control element causes the broadcast of an audible message. The message is intended to communicate to the patient information pertaining to the subject medication and administration instructions. Alternatively, the control element may cause the display of the same or related information on the digital panel of the dispenser. Thirdly, the control element causes the integrated mini-camera to snap a picture of the patient removing the pill from the dispenser.

In an alternative embodiment, the mini-camera is replaced by a video recorder which records and/or transmits live pictures for a predetermined length of time after the switch is tripped.

Finally, the adjustment counter is incremented (2039). This ensures that the next time real time equates to administration time for any medication, the program causes the control element to reprocess the master administration criteria. In that event, the program reads the new information and the medication administration criteria generates updated prescription schedules therefrom.

In a final illustration, the interplay between the control system and operation of the schedule program is shown in a simple example involving a compliance, co-ordination and dispensing system handling a medication regimen consisting of two different medications stored in two of its dispensers. Each dispenser is dedicated to one of two medication types defined by the medication administration criteria. The dosage for the first medication is one pill every, for example, four hours; the dosage for the second is, for example, two pills every eight hours. Furthermore, the medication criteria prevents the patient from taking the second pill within, for example, any one-hour period of the first.

When the program processes the medication administration criteria, two prescription schedules are generated, reflecting initial user-defined values. According to the first schedule, one pill of the first medication is to be self-administered at administration times of the zero hour, the fourth hour, the eight hour, and so on. Accordingly, the second prescription schedule dictates administration times at the second hour, the tenth hour and so on.

Barring any subsequent adjustments to the medication criteria, the first pill is automatically dispensed at zero hour, at which time all the associated alarms, messages and other signals are activated, and the adjustment counter is incremented by one. In this example, however, the patient is away from the home when he/she is alerted via his/her co-ordination wristwatch. He/she chooses, however, not to rush home but instead to remove the first pill from its compartment one hour after the alert. At that time, the alarms are deactivated, messages are broadcast, the mini-camera snaps a picture and the time is recorded and stored in internal memory of the control element.

One hour later, at the second hour, real time equates to administration time for the second medication. However, the adjustment counter is greater than zero causing the program to loop back to run the schedule program and process the medication administration criteria. At this point, new information is available to the medication administration criteria—one pill of medication one was dispensed at zero hour, the pill of medication one was taken at the first hour, and real time equals the second hour.

With this new information, updated prescription schedules for medication one and medication two are generated. These new schedules may postpone the administration time for the second medication to the third hour and adjust the administration intervals for the first medication starting at the fifth hour rather than the fourth.

The foregoing, of course, is merely exemplary and subject to great variation and addition.

It is noted that the embodiments described herein in detail for exemplary purposes are, of course, subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

What is claimed is:

1. A medication compliance, co-ordination and dispensing system for dispensing a plurality of medications in a medication regimen according to a defined prescription schedule, comprising:

an upright, centrally located main housing containing a plurality of electronic devices, a power supply, a main front panel for attaching a plurality of output devices, and a control element, wherein said control element is in communication with said plurality of electronic devices, each said device being actuable by said control element and in communication with said plurality of output devices, each device actuable by said control element, said control element including memory means for storing programs and data and a microprocessing means for processing a program for generating a prescription schedule containing administration times for each medication in the medication regimen;

clock means associated with said control element for indicating real time;

a plurality of secondary housing means positioned in two rows on opposite sides of the main housing, each said secondary housing means engageable with adjacent secondary housing means and/or the main housing;

storage means located inside each secondary housing means and dedicated to storing a medication with defined administration times in accordance with the program generated prescription schedule;

dispensing means located inside each secondary housing means and associated with said storage means for dispensing said medication, wherein said dispensing means is actuable by the control element when the clock means indicates real time matching said defined administration times;

receiving means dedicated to each dispensing means and capable of receiving medications delivered by the dispensing means;

compartment means dedicated to each receiver means and capable of containing medication received by said receiver means until said medication is removed by the patient; and a plurality of first indicator means positioned on the outside of each secondary housing means, said indicator means actuable by the control element when real time equals said defined medication administration time for the said medication.

2. The medication compliance, co-ordination and dispensing system of claim 1, wherein said plurality of first indicator means is an illuminated bulb.

3. The medication compliance, co-ordination and dispensing system of claim 1, wherein said plurality of first indicator means is an audible alarm.

4. The medication compliance, co-ordination and dispensing system of claim 1, wherein said secondary housing means includes a front surface panel for embedding medication information in braille.

5. The medication compliance, co-ordination and dispensing system of claim 1, further comprising:

voice means located inside the main housing and actuable by the control element; and speaker means for broadcasting output of said voice means.

6. The medication compliance, co-ordination and dispensing system of claim 5, wherein said voice means is actuable by the control element to selectively broadcast a predetermined message when real time equals said defined medication administration time.

7. The medication compliance, co-ordination and dispensing system of claim 1, wherein said compartment means includes:

a hinged trap door for accessing the dispensed medication contained in the compartment means; and switch means associated with said hinged trap door and the control element such that when the trap door is opened the switch means is closed.

8. The medication compliance, co-ordination and dispensing system of claim 7, further comprising:

display means located on the outside surface of each secondary housing means, said display means actuable by the control element, wherein when said switch means is closed, the control element causes said display means to display a message.

9. The medication compliance, co-ordination and dispensing system of claim 1, further comprising:

a user-worn signal receiving device wherein the signal receiving device is activated when real time equals said defined medication administration time for a medication in the medication regimen.

10. The medication compliance, co-ordination and dispensing system of claim 9, further comprising:

signal transmission means associated with the control element for communicating with said signal receiving device.

11. The medication compliance, co-ordination and dispensing system of claim 9, wherein the user-worn signal receiving device includes:

display means for communicating medication information to the patient; and vibrating means for alerting the patient at the defined medication administration time.

12. The medication compliance, co-ordination and dispensing system of claim 9, wherein the user-worn signal receiving device further includes sound means for alerting the patient at the defined medication administration time.

13. The medication compliance, co-ordination and dispensing system of claim 9, wherein the signal receiving device is a user-worn wristwatch.

14. The medication compliance, co-ordination and dispensing system of claim 13, wherein the user-worn wristwatch is programmable, said wristwatch including vibrator means, and wherein the wristwatch is programmed in conjunction with said prescription schedule such that when real time equals said defined administration time the vibrator means is activated.

15. The medication compliance, co-ordination and dispensing system of claim 13, wherein the user-worn wristwatch further includes sound means, and wherein the wristwatch is programmed in conjunction with the said prescription schedule such that when real time equals medication administration time, the sound means is activated.

16. The medication compliance, co-ordination and dispensing system of claim 7, further comprising:

a camera actuable by the control element when said switch means is closed.

17. The medication compliance, co-ordination and dispensing system of claim 7, further comprising:

a video camera, said video camera being capable of transmitting live pictures to a remote location.

18. The medication compliance, co-ordination and dispensing system of claim 1, further comprising:

a second indicator means actuable by the control element, for alerting the user of low supply status of a storage means.

19. The medication compliance, co-ordinating and dispensing system of claim 1, wherein one or more of the medication storage means is capable of storing medication in the liquid form and one or more of the dispensing means is capable of dispensing medication in the liquid form.

20. The medication compliance, co-ordination and dispensing system of claim 1, wherein the control element further report means for generating a report on demand.

21. The medication compliance, co-ordination and dispensing system of claim 1, wherein the control element further includes means for communicating with an external programming unit.

22. The medication compliance, co-ordination and dispensing system of claim 1, wherein the control element further includes means for communicating via telephone modem.

23. A method of dispensing a first and second medication in a medication regimen, comprising the steps of:

providing a control element including clock means for indicating real time, memory means and microprocessor means;

providing a cabinet including a main housing, a plurality of storage means, dispensing means associated with each storage means and actuable by the control element, and compartment means associated with each dispensing means and for receiving medication dispensed by said dispensing means;

selectively storing the first medication inside a first storage means and the second medication inside a second storage means;

storing a schedule program in the memory means;

storing a user-defined medication administration criteria in the memory means;

using the microprocessing means to process the schedule program such that prescription schedules for each of the first and second medications are generated in accordance with the medication administration criteria, said prescription schedules including defined medication administration times;

using the control element to cause the first dispensing means to deliver a predetermined amount of the first medication into the first compartment means when real time equals the medication administration time for the first medication; and, using the control element to cause the second dispensing means to dispense a predetermined amount of the second medication into the second compartment means when real time equals the medication administration time for the second medication.

24. The method of claim 23, wherein the compartment means further includes:

a hinged trap door for accessing said dispensed medication; and, switch means associated with each trap door; and wherein there is further included the step of:

using the opening of the trap door to close the switch means.

25. The method of claim 21, further comprising the steps of:

recording real time in the memory means whenever said switch means status changes from open to closed;

incorporating said real time in the medication administration criteria; and processing the schedule program to generate updated prescription schedules for the first and second medications after each time the first or second switch means is closed but before the first and second dispensing means is actuated by the control element.

26. The method of claim 23, further comprising the steps of:

providing a first counter means associated with said first switch means and a first indicator means associated with said first counter means;

initializing first counter means to a predetermined first value;

decrementing said first counter means each time said first switch means is closed;

activating the first indicator means when the first counter means equals the second threshold value;

refilling said first storage means with said first medication; and deactivating first indicator means and re-initializing said first counter means to first value.

* * * * *